(12) United States Patent
Kirby

(10) Patent No.: US 6,716,550 B1
(45) Date of Patent: Apr. 6, 2004

(54) SEALING MEMBRANE ELECTRODE ASSEMBLIES FOR ELECTROCHEMICAL FUEL CELLS

(75) Inventor: Christopher T. Kirby, Burlington (CA)

(73) Assignee: Ballard Power Systems Inc., Burnaby (CA)

( * ) Notice: Subject to any disclaimer, the term of this patent is extended or adjusted under 35 U.S.C. 154(b) by 0 days.

(21) Appl. No.: 10/327,650

(22) Filed: Dec. 20, 2002

(51) Int. Cl.[7] ................................................ H01M 2/08
(52) U.S. Cl. ........................ 429/35; 429/34; 429/36; 429/131; 429/171; 429/173; 429/174
(58) Field of Search ............................ 429/35, 34, 36, 429/131, 171, 173, 174; 29/623.1, 623.2

(56) References Cited

U.S. PATENT DOCUMENTS

| 5,176,966 A | 1/1993 | Epp et al. .................. 429/26 |
| 5,284,718 A | 2/1994 | Chow et al. ................ 429/26 |
| 5,976,726 A | 11/1999 | Wilkinson et al. .......... 429/35 |
| 6,057,054 A | 5/2000 | Barton et al. ............... 429/42 |
| 6,596,427 B1 * | 7/2003 | Wozniczka et al. ......... 429/32 |
| 2002/0102453 A1 | 8/2002 | Suenaga et al. ............. 429/37 |

FOREIGN PATENT DOCUMENTS

| JP | 2000-294254 | 10/2000 |
| JP | 2002-260692 | 9/2002 |
| WO | WO 02/093669 A2 | 11/2002 |

* cited by examiner

*Primary Examiner*—Patrick Ryan
*Assistant Examiner*—Angela J. Martin
(74) *Attorney, Agent, or Firm*—Seed IP Law Group PLLC

(57) ABSTRACT

An elastomer may be used to construct a separate, moldable part that engages the edge a membrane electrode assembly (MEA) to thereby seal the MEA. The seal has a groove defining two sealing portions separated by a web portion. The groove of the seal then engages the edge of the MEA and can maintain a tight fit without the need for additional adhesives. Additional features may extend laterally from the web portion to assist in separating cathode and anode plates and/or encompass, for example, manifold openings.

16 Claims, 2 Drawing Sheets

SEALING MEMBRANE ELECTRODE ASSEMBLIES FOR ELECTROCHEMICAL FUEL CELLS

BACKGROUND OF THE INVENTION

1. Field of the Invention

The present invention relates to electrochemical fuel cells. In particular, the invention provides an improved seal for a membrane electrode assembly for a fuel cell, and a method of making an improved membrane electrode assembly.

2. Description of the Related Art

Electrochemical fuel cells convert reactants, namely, fuel and oxidant fluid streams, to generate electric power and reaction products. Electrochemical fuel cells employ an electrolyte disposed between two electrodes, namely a cathode and an anode. The electrodes each comprise an electrocatalyst disposed at the interface between the electrolyte and the electrodes to induce the desired electrochemical reactions. The location of the electrocatalyst generally defines the electrochemically active area.

Solid polymer fuel cells generally employ a membrane electrode assembly ("MEA") consisting of an ion exchange membrane disposed between two fluid distribution layers comprising porous, electrically conductive sheet material. The membrane is ion conductive (typically proton conductive), and also acts as a barrier for isolating the reactant streams from each other. Another function of the membrane is to act as an electrical insulator between the two fluid distribution layers. The electrodes should be electrically insulated from each other to prevent short-circuiting.

It is desirable to seal reactant fluid stream passages to prevent leaks or inter-mixing of the fuel and oxidant fluid streams. Fuel cell stacks typically employ resilient seals between stack components. Such seals isolate the manifolds and the electrochemically active area of the fuel cell MEAs by circumscribing these areas. For example, a fluid tight seal can be achieved in a conventional fuel cell stack by using elastomeric gasket seals interposed between the flow field plates and the membrane, with sealing effected by applying a compressive force to the resilient gasket. Accordingly, it is important for conventional fuel cell stacks to be equipped with seals and a suitable compression assembly for applying a compressive force to the seals.

Conventional methods of sealing around plate manifold openings and MEAs within fuel cells include framing the MEA with a resilient fluid impermeable gasket, placing preformed gaskets in channels in the electrode layers and/or separator plates, or molding seals within grooves in the electrode layer or separator plate, circumscribing the electrochemically active area and any fluid manifold openings. Examples of conventional methods are disclosed in U.S. Pat. Nos. 5,176,966 and 5,284,718. Typically, the gasket seals are cut from a sheet of gasket material. For a gasket seal that seals around the electrochemically active area of the MEA, the central portion of the sheet is cut away. This procedure results in a large amount of the gasket material being wasted. Because the fluid distribution layers are porous, for the gasket seals to operate effectively, the gasket seals ordinarily are in direct contact with the flow field plates and the ion exchange membrane. Therefore, in a conventional MEA, electrode material is cut away in the sealing regions so that the gasket will contact the ion exchange membrane. Some MEAs employ additional thin-film layers to protect the ion exchange membrane where it would otherwise be exposed in the gasket seal areas. Separate components such as gasket seals and thin-film layers require respective processing or assembly steps, which add to the complexity and expense of manufacturing fuel cell stacks.

Accordingly, it is desirable to simplify and reduce the number of individual or separate components involved in sealing in a fuel cell stack since this reduces assembly time and the cost of manufacturing.

BRIEF SUMMARY OF THE INVENTION

An improved membrane electrode sealing assembly for an electrochemical fuel cell comprises:

- a membrane electrode assembly having two fluid distribution layers, an ion exchange membrane and catalyst layers disposed between the ion exchange membrane and each fluid distribution layer; and
- a framing seal having a groove, the groove defining two sealing portions separated by a web portion in the framing seal.

The groove of the framing seal engages the edge of the membrane electrode assembly.

The framing seal may be an elastomer such as, for example, silicones, fluorosilicones, fluoroelastomers, ethylene-co-propylene diene monomer (EPDM), natural rubber, nitrile rubber, butyl rubber, polyurethane or a thermoplastic elastomer. The framing seal may be formed by, for example, injection molding, compression molding, insert molding, etc. The framing seal may extend laterally beyond the membrane electrode assembly to form an external region having manifold openings therein. The framing seal may have manifold seals around such manifold openings as well as fluid distribution features formed therein.

A method of making such a membrane electrode sealing assembly comprises:

- providing a membrane electrode assembly;
- providing a framing seal having a groove, the groove defining two sealing portions separated by a web portion in the framing seal; and
- fitting the membrane electrode assembly into the groove of the framing seal such that the framing seal engages the edge of the impregnated membrane electrode assembly.

A tight fit will be observed between the framing seal and the MEA if the framing seal is the same size as or slightly smaller than the MEA and thus no adhesive is necessary.

These and other aspects of the invention will be evident upon reference to the attached figures and following detailed description.

BRIEF DESCRIPTION OF THE DRAWINGS

In the above figures, similar references are used in different figures to refer to similar elements.

DETAILED DESCRIPTION OF THE INVENTION

In the following description, certain specific details are set forth in order to provide a thorough understanding of the various embodiments of the present improved membrane electrode assembly. However, one skilled in the technology involved here will understand that the present improved membrane electrode assembly can be practiced without these details. In other instances, well-known structures associated with polymer electrolyte fuel cells and fuel cell stacks have not been shown or described in detail to avoid unnecessarily obscuring descriptions of the embodiments of the present membrane electrode assembly.

Figure 1:
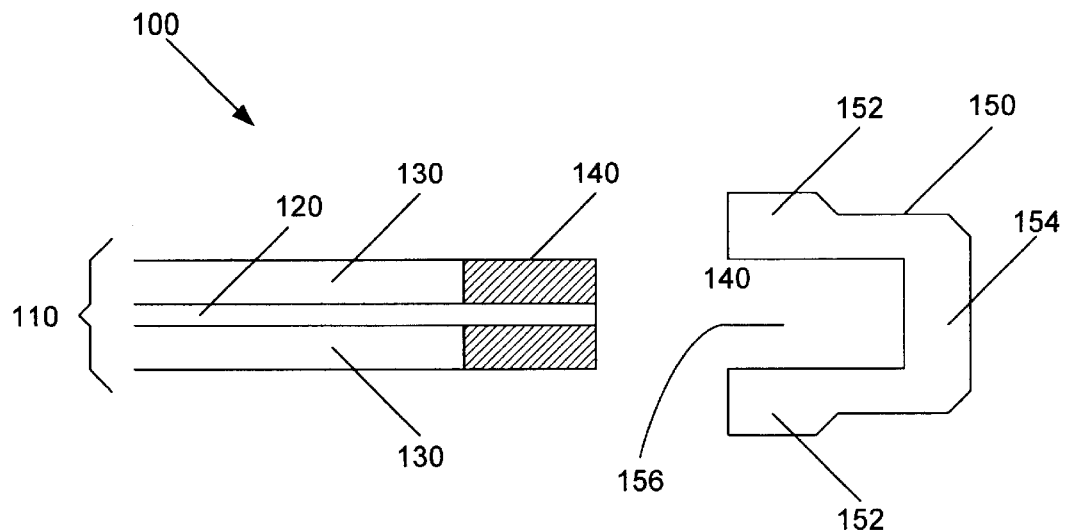
FIG. 1 is a partially exploded cross-sectional view of an embodiment of a membrane electrode sealing assembly.

FIG. 1 illustrates an exploded cross-sectional view of a membrane electrode sealing assembly (MESA) 100. MESA 100 comprises a sealed membrane electrode assembly (MEA) 110. MEA 110 has an ion-exchange membrane 120 interposed between two fluid distribution layers 130.

Fluid distribution layers 130 are electrically conductive and fluid permeable. Electrical conductivity allows for the electron flow from the anode to the cathode through an external load. Permeability allows for the supply of fuel and oxidant from the fuel and oxidant streams respectively to the electrocatalyst where the electrochemical reaction occurs. Fluid distribution layers typically comprise porous, electrically conductive and fluid permeable preformed sheets composed of materials such as, for example, carbon fiber paper, woven or non-woven carbon fabric, metal mesh or gauze, or microporous polymeric film.

The electrocatalyst in catalyst layers (not shown) disposed between the fluid distribution layers 130 and ion-exchange membrane 120 may be a metal black, an alloy or a supported metal-based catalyst, for example, platinum on carbon particles. Catalyst layers may also include an organic binder such as polytetrafluoroethylene (PTFE), polymer electrolyte and fillers. Due to the different catalytic reactions occurring during operation of the fuel cell at the anode as compared to the cathode, the anode catalyst layer and cathode catalyst layer typically comprise different catalytic compositions such as, for example, different catalysts and/or different amounts of catalyst.

Ion exchange membrane 120 may be, for example, a fluoropolymer containing pendant sulfonic acid functional groups and/or carboxylic acid functional groups. A typical perfluorosulfonic acid/PTFE copolymer membrane can be obtained from DuPont Inc. under the trade designation NAFION®.

Along the edge of MEA 110, an integral seal 140 comprising a fluid impermeable sealant material that impregnates the porous electrode layers of MEA 110. U.S. Pat. No. 6,057,054, incorporated herein by reference, discloses a similar integral seal. The sealant material is chosen for mechanical and chemical resistance characteristics that are suitable for use in the fuel cell. For example, thermoplastic materials can be employed such as thermoplastic polymers, and plastics and composites including thermoplastic polymers. Thermoset materials can also be suitable provided they are not too brittle.

Integral seal 140 can be formed by for example, injection molding. Suitable materials for injection molding include liquid injection moldable elastomeric compounds, such as silicones, fluoroelastomers, fluorosilicones, ethylene-co-propylene diene monomer (EPDM) and natural rubber. As an alternative to injection molding, sheet material can be bonded to MEA 110. For example, a sheet of rigid sealant material could be thermally bonded, or two or more sheets laminated (thermally, or by the application of adhesives or solvents), so that the material is impregnated into the porous layers of MEA 110. Suitable such sealant materials available in sheet form include polytetrafluoroethylene(PTFE), poly-vinyl fluoride, acrylic, polyvinyl fluoride, epoxy, vinyl ester, etc. The selection of particular rigid sealant materials is not essential to the present MEA, and persons of ordinary skill in the technology involved here can readily choose suitable such sealant materials for a given application. Integral seal 140 may be flush with the edge of MEA 110 as illustrated in FIG. 1. Alternatively, integral seal 140 may extend laterally beyond the edge of MEA 110.

A separate framing seal 150 engages the edge of MEA 110. Framing seal 150 comprises two sealing portions 152 and a web portion 154. Further, the two sealing portions and the web portion are of a unitary construction. MEA 110 fits into groove 156. Each sealing portion 152 automatically aligns relative to the other sealing portion 152. Suitable materials for framing seal 150 include liquid injection moldable elastomeric compounds, such as, for example, silicones, fluoroelastomers, fluorosilicones, EPDM and natural rubber.

The material chosen for integral seal 140 may then be different from the material for framing seal 150. For example, materials that are not easily impregnated into fluid distribution layers 130 or that require curing temperatures incompatible with MEA 110 may be used. Further, considerations of compatibility with MEA 110, and particularly ion exchange membrane 120, are more important with integral seal 140 than framing seal 150. Thus greater flexibility is allowed while still maintaining a reduced number of sealing components.

Figure 2:
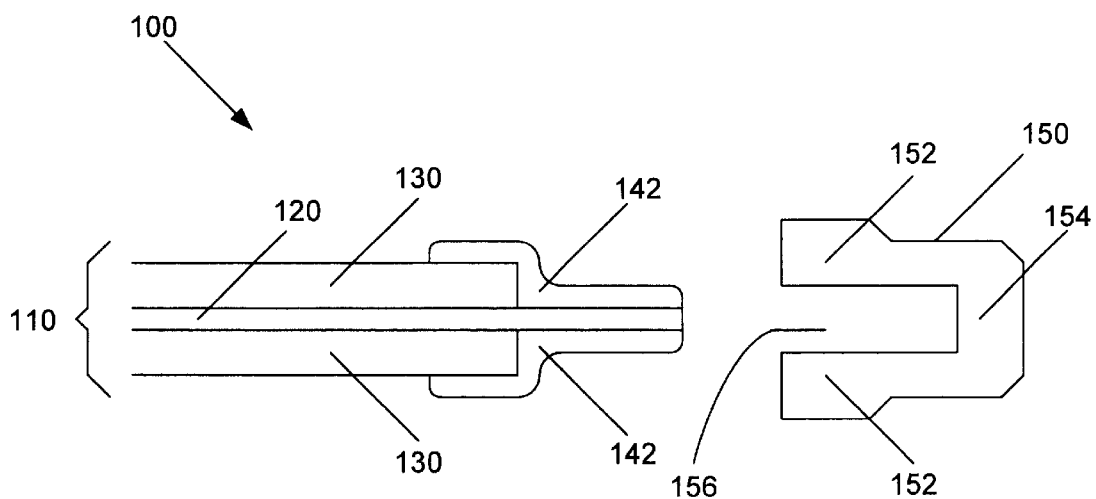
FIG. 2 is a partially exploded cross-sectional view of a second embodiment of a membrane electrode sealing assembly.

FIG. 2 illustrates another embodiment where an external seal 142 coats the edge of MEA 110 with perhaps only an incidental amount of sealant impregnating fluid distribution layers 130. In the embodiment illustrated in FIG. 2, ion-exchange membrane 120 extends beyond the edge of MEA 110 and is not flush-cut as in FIG. 1. External seal may comprise for example an epoxy or an inert polyimide film such as KAPTON® as sold by DuPont Inc.

Figure 3:
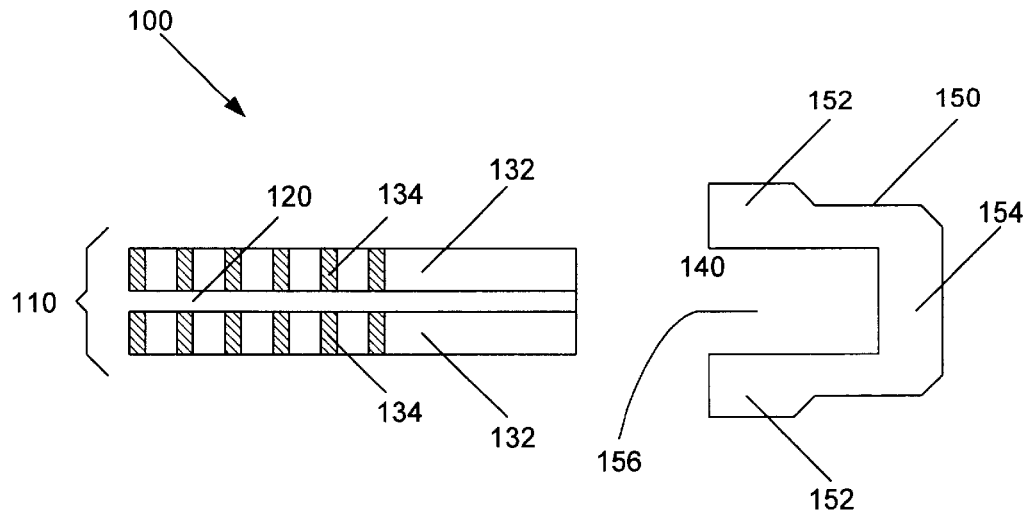
FIG. 3 is a partially exploded cross-sectional view of a further embodiment of a membrane electrode sealing assembly.

In another embodiment as shown in FIG. 3, fluid distribution layers 132 comprise a substantially fluid impermeable sheet material that is perforated at least in the electrochemically active region as disclosed in U.S. Pat. No. 5,976,926 hereby incorporated by reference. Perforations 134 render the respective fluid distribution layer fluid permeable at least in the through-plane direction. Perforations 134 may contain a filler material which may be electrically conductive or insulating. The filler material may also comprise particulate carbon or hydrophilic or hydrophobic materials which do not completely block the perforations to passage of reactant. The substantially fluid impermeable sheet material in fluid distribution layers 132 may be formed from an electrically conductive material such as flexible graphite, carbon resin or a metal. Flexible graphite is also known as graphite foil, exfoliated graphite and expanded graphite.

Framing seal 150 engages the edge of MEA 110 as in the other embodiments illustrated. In yet another embodiment (not shown), the framing seal directly engages the MEA without the need for an additional seal such as integral seal 140 (FIG. 1) or external seal 142 (FIG. 2).

Framing seal 150 is molded as a separate and distinct part by, for example, injection molding, compression molding, insert molding, etc. After bonding of MEA 110 and integral seal 140 has been impregnated, framing seal 150 may then be stretched over the edges of MEA 110. In some applications, MEA 110 may have a non-bonded configuration. An external fixture may be also be easily adapted to assist in applying framing seal 150 to MEA 110. The size of framing seal 150 determines how well framing seal 150 fits onto MEA 110. If framing seal 150 is slightly undersized, a tight fit with MEA 110 may be observed without deforming MEA 110. Further, no adhesive is needed between framing seal 150 and MEA 110. As an alternative to stretching framing seal 150 over MEA 110, interlocking tabs or a zipper-like feature could be molded into framing seal 150 (embodiment not illustrated).

Figure 4:
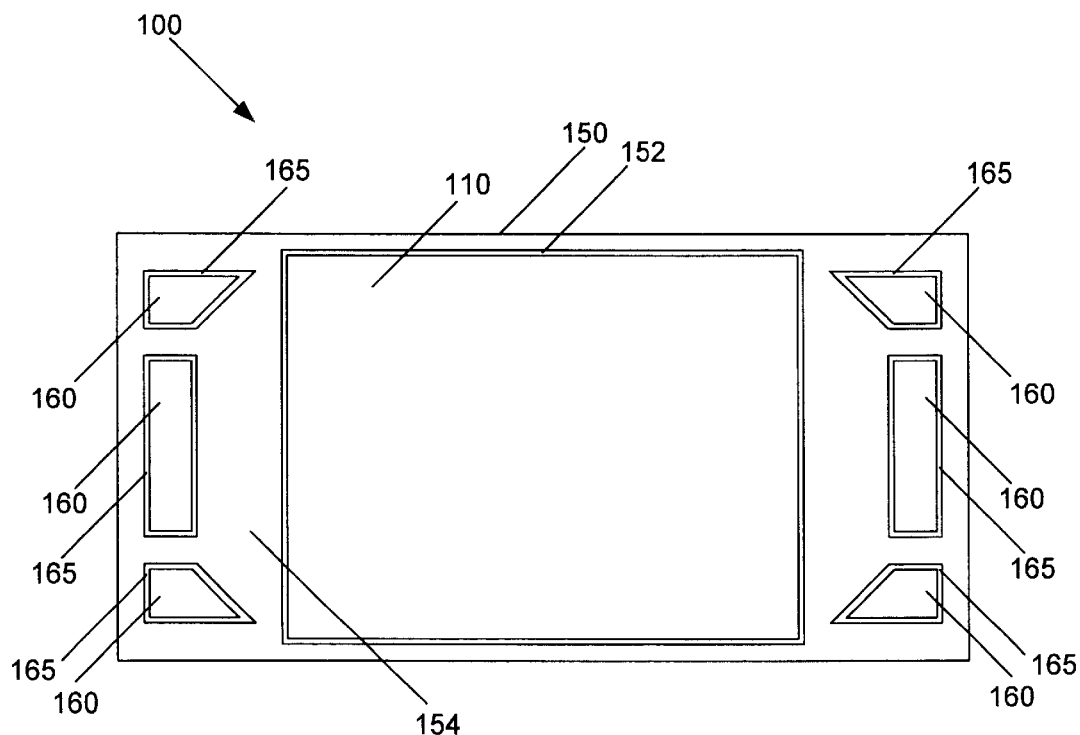
FIG. 4 is a plan view of a further embodiment of a membrane electrode sealing assembly.

FIG. 4 illustrates a plan view of another embodiment of MESA 100 wherein web 154 of framing seal 150 extends laterally beyond MEA 110 and encompasses manifold openings 160. Each manifold opening 160 provides one of reactant, oxidant and coolant to the fuel cell. In the region laterally extending from MEA 110, web 154 may be substantially thinner than MEA 110. Manifold seals 165 may also be formed in framing seal 150. As web 154 is molded from an electrically isolating material, web 154 may also electrically isolate anode and cathode flow field plates (not shown). Other features (not shown) may also be molded into framing seal 150 to help position MESA 100 against adjacent flow field plates.

In addition, the region of framing seal 150 between MEA 110 and manifold openings 160 may also incorporate fluid distribution features (not shown) for assisting flow of reactants and/or coolant from respective manifold openings 160 to the active area of MEA 110. Such features could be molded, stamped or otherwise formed in framing seal 150, as desired.

From the foregoing, it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A membrane electrode sealing assembly comprising:
   a membrane electrode assembly having two electrodes, an ion exchange membrane and catalyst layers disposed between the ion exchange membrane and each electrode; and
   a framing seal having a groove, the groove defining two sealing portions separated by a web portion in the framing seal;
   wherein the groove of the framing seal engages the edge of the membrane electrode assembly.

2. The membrane electrode sealing assembly of claim 1 wherein the framing seal is an elastomer.

3. The membrane electrode sealing assembly of claim 2 wherein the framing seal is an elastomer selected from silicones, fluorosilicones, fluoroelastomers, ethylene-co-propylene diene monomer, natural rubber, nitrile rubber, butyl rubber, polyurethane and a thermoplastic.

4. The membrane electrode sealing assembly of claim 1 further comprising an integral seal impregnated into each electrode along the edge of the membrane electrode assembly.

5. The membrane electrode sealing assembly of claim 4 wherein the integral seal and the framing seal are different sealant materials.

6. The membrane electrode sealing assembly of claim 4 wherein the integral seal is an elastomeric selected from the group of silicones, fluorosilicones, fluoroelastomers, ethylene propylene diene monomer, natural rubber, polytetrafluoroethylene, polyvinyl fluoride, acrylic and polyvinyl fluoride.

7. The membrane electrode sealing assembly of claim 1 wherein the framing seal further comprises an external region that extends laterally from the web portion.

8. The membrane electrode sealing assembly of claim 7 wherein the external region comprises manifold openings therein.

9. The membrane electrode sealing assembly of claim 7 wherein the external region comprises fluid distribution features formed therein.

10. A fuel cell comprising the membrane electrode sealing assembly of claim 1.

11. A seal for a membrane electrode assembly, the seal comprising a groove in an elastomer, the groove defining two sealing portions separated by a web portion.

12. The seal of claim 11 wherein the elastomer is selected from silicones, fluorosilicones, fluoroelastomers, ethylene-co-propylene diene monomer, natural rubber, nitrile rubber, butyl rubber, polyurethane and a thermoplastic.

13. A method of making a membrane electrode sealing assembly comprising:
    providing a membrane electrode assembly;
    providing a framing seal having a groove, the groove defining two sealing portions separated by a web portion in the framing seal; and
    fitting the membrane electrode assembly into the groove of the framing seal such that the framing seal envelopes the edge of the impregnated membrane electrode assembly.

14. The method of claim 13 wherein the providing a membrane electrode assembly step comprises bonding two electrodes and an ion exchange membrane together to form a membrane electrode assembly.

15. The method of claim 13 wherein the providing a membrane electrode assembly step further comprises impregnating sealant material into the edge of the electrodes.

16. The method of claim 13 wherein the framing seal further comprises an external region that extends laterally from the web portion, the external region having manifold openings therein.

* * * * *